June 10, 1952  B. A. KNAUTH ET AL  2,600,003
THYRATRON CONTROL SYSTEM FOR ELECTRIC MOTORS
Filed March 1, 1948
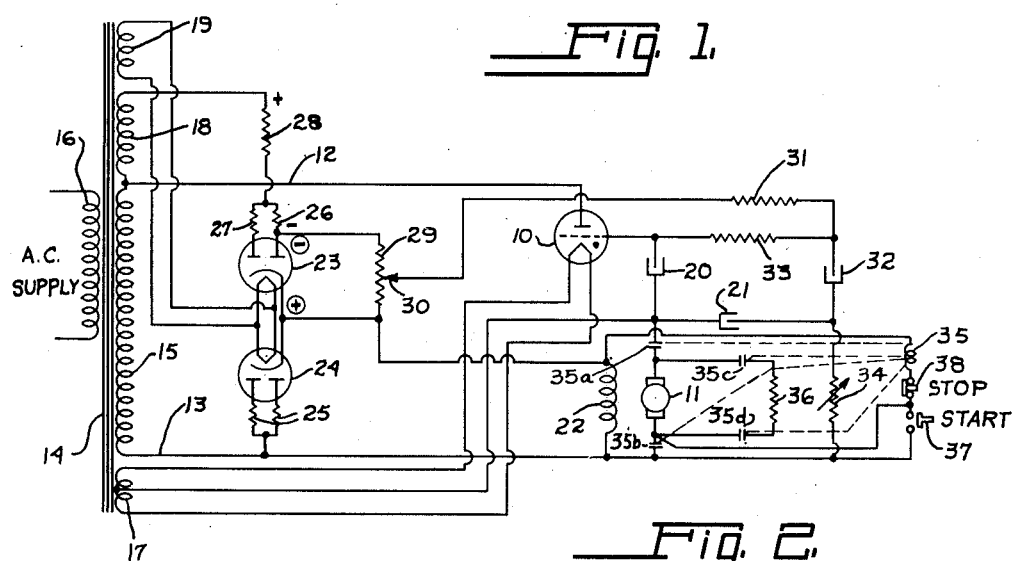
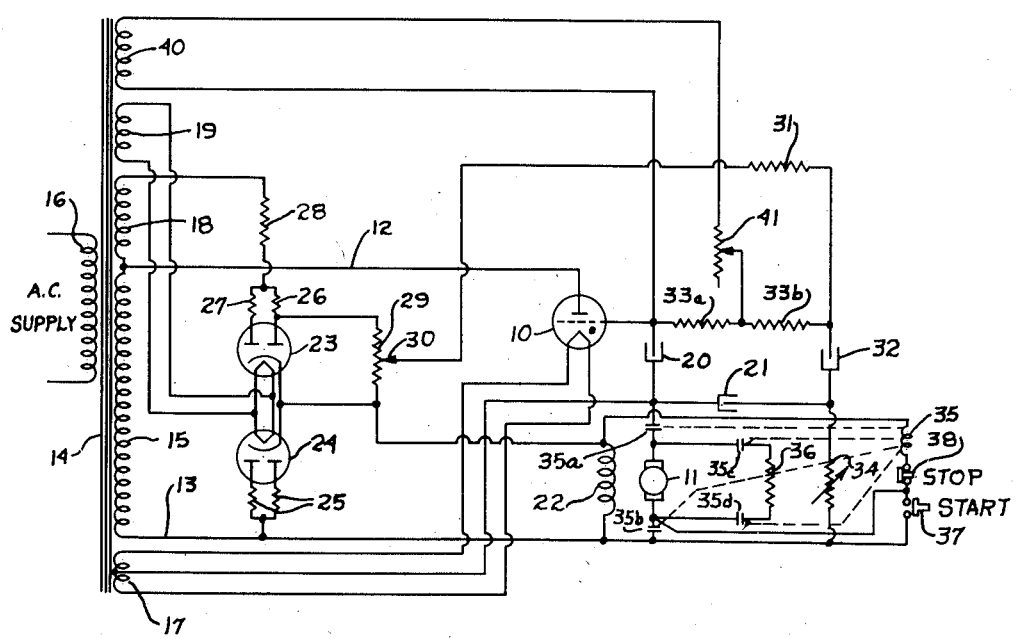
INVENTORS
BERTHOLD A. KNAUTH
AND PAO H. CHIN
BY
Semmes, Keegin, Robinson & Semmes
ATTORNEYS Patented June 10, 1952

2,600,003

UNITED STATES PATENT OFFICE 2,600,003

THYRATRON CONTROL SYSTEM FOR ELECTRIC MOTORS

Berthold A. Knauth, Bolton, N. Y., and Pao Hsiung Chin, Cranford, N. J., assignors to The Motorspeed Corporation, New York, N. Y.

Application March 1, 1948, Serial No. 12,327

5 Claims. (Cl. 318—345)

Our invention relates to controlling the firing angle of thyratron tubes in which it has many applications, such as arc-welding, resistance welding, servo mechanisms, the control of the rate of rotation of electric motors, and other applications which will be apparent from the ensuing description.

In controlling the firing of thyratron tubes which are grid-controlled gaseous discharge devices that permit the passage of current in only one direction, there are several factors which, in general, effect the firing of the tubes. Control of the output of the tubes can be effected by controlling the firing angle which is dependent on a combination, among others, of the following factors: (1) The grid-to-cathode potential, or grid bias, of the tube as effected by the net instantaneous algebraic sum of the voltage or voltages applied to the grid; (2) The simultaneously occurring anode-to-cathode potential of the tube which is the net instantaneous algebraic sum of all the voltages applied to the anode, which in this instance includes both the alternating supply voltage and the counter E. M. F. of the motor armature.

In our system we employ means for utilizing an adjustable direct potential, which is one component of voltage by which the grid of the thyratron tube is biased, and which may be derived by a suitable phase shifting network from the source of alternating current with which the system is supplied, and thus we obtain an adjustable reference voltage without the use of auxiliary equipment.

An object of this invention is to provide an electronic speed control for electric motors in which the speed control potentiometer is arranged so that it can be used to turn the motor off completely.

A further object of this invention is to provide a thyratron control circuit in which there is employed an adjustable reference voltage in the grid-cathode circuit of the thyratron that may be of either positive or negative polarity.

Still a further object of this invention is to provide a thyratron control circuit in which there is employed an adjustable reference voltage that is obtained from a direct potential at a level separated by an alternating potential from the potentials of the thyratron power circuits, said reference voltage being employed in the thyratron grid-cathode circuit and being of either a positive or negative polarity.

Another object of this invention is to provide an electronic control circuit for electric motors in which the wave form of the motor field excitation has very slight effect on the control characteristics of the electronic circuit which it supplies.

Still another object of this invention is to provide an improved electronic circuit for controlling direct current motors in which the speed of the motor from substantially no load to full load may be regulated automatically.

Still another object of this invention is to provide an electronic circuit arrangement for energizing both the armature and field of a direct current motor by rectified A. C., the torque developed by the motor at a certain value of armature current being equal to the torque developed for the same armature current when the motor is energized from a D. C. voltage source.

Other objects of this invention will be apparent to those skilled in the art to which it relates from the following specification, claims and drawing.

In the drawing:

Figure 1 illustrates a schematic wiring diagram of an electronic control device employing a thyratron; and, Figure 2 illustrates a schematic wiring diagram of a thyratron motor control circuit in which an alternating potential is introduced into the grid circuit of the thyratron for supplementary motor speed control purposes.

Referring to the drawings in detail, there is illustrated a circuit arrangement employing a thyratron 10 for controlling the current supplied to the armature 11 of a direct current motor from the alternating current supply lines 12 and 13. The alternating current supply lines 12 and 13 are shown connected to the terminals of the secondary winding 15 of a transformer 14, the primary 16 of which is connected to an alternating current supply of substantially constant voltage. However, the winding 15 may be connected across the alternating current supply lines directly so as to avoid the necessity of designing a transformer adapted to handle the D. C. components of the motor circuit.

The anode of the thyratron 10 is connected to the A. C. supply line 12 and the cathode is heated by current supplied by a low voltage secondary 17 of the transformer 14. The center tap of the secondary 17 is connected to the upper brush of the armature 11 via contact 35a and to one terminal of each of the capacitors 20 and 21. The field winding 22 of the direct current motor is connected between the alternating current line 13 and the cathodes of the rectifiers 23 and 24.

The anodes of the rectifier 24 are connected through the resistors 25 to the alternating current line 13 and the anodes of the rectifier 23 are connected together through the resistors 26 and 27. The junction of these resistors 26 and 27 is connected to the resistor 28 and through this resistor 28 to the upper terminal of the secondary winding 18. The lower terminal of the secondary 18 is connected to the upper terminal 12 of the secondary 15. Another lower voltage secondary 19 is provided for heating the cathode heaters of the rectifiers 23 and 24.

The rectifier 23 rectifies the voltage of the secondary windings 15 and 18 and supplies current to the field winding 22. If the voltage of the secondary 15 is sufficient for energizing the field winding 22 then the secondary 18 may be dispensed with and the resistor 28, instead of being connected to the upper terminal of the secondary 18, may be connected to the alternating current line 12.

The winding 29 of the potentiometer is connected to the cathode and one of the anodes of the rectifier tube 23 and the slider 30 of this potentiometer is connected to one terminal of the resistor 31. The other terminal of the resistor 31 is connected to one terminal of the capacitor 32 and to one terminal of the grid current limiting resistor 33. The other terminal of the resistor 33 is connected to the grid terminal of the transient current by-pass capacitor 20.

The capacitor 21 and the resistor 34 are connected in series across the armature 11 including contacts 35a and 35b and the capacitor 32 is connected between the junction of the capacitor 21 and the resistor 34 and the junction of the resistors 31 and 33.

The relay 35 is provided with four contacts 35a, 35b, 35c and 35d, all of which are connected to the brushes of the armature 11. The contacts 35a are connected between the upper brush of the armature 11 and the cathode of the thyratron 10 and the contacts 35b are connected between the lower brush of the armature 11 and the alternating current line 13. These contacts 35a and 35b are closed by the relay 35 when the start button 37 is closed and at this time the contacts 35c and 35d are opened by this relay. The contacts 35c and 35d are closed by the relay 35 when the motor is to be stopped; this is accomplished by opening the circuit of the stop button 38. Simultaneously the contacts 35a and 35b are opened by the relay 35. When the contacts 35c and 35d are closed the resistor 36 is connected across the armature 11 to act as a dynamic brake on the armature by absorbing the current generated by the armature and to limit the short circuit current in event contacts 35a and 35b arc over while 35c and 35d close.

The inverse voltage across the rectifier 23, that is, when the anodes of this rectifier are negative with respect to the cathode, is employed through the connection of the resistor 31 to the slider 30 of the potentiometer winding 29 to charge the grid side of the capacitor 32 negatively. For this purpose the slider 30 of this potentiometer should be placed adjacent to the top end of this potentiometer winding 29. This negative potential on the grid side of the capacitor 32 is necessary if it is desired to run the motor at a very low speed or to stop the motor and the magnitude of the negative potential may be controlled by the slider 30 of the potentiometer so that the motor speed even to the stopping point may be controlled thereby.

The resistor 31 and capacitor 32 that are connected in series between the slider 30 of the potentiometer 29 and the junction between the capacitor 21 and the resistor 34 are supplied with alternating voltage from the secondary windings 15 and 18 and function to shift the phase of the A. C. voltage applied to the grid of the thyratron 10 by approximately 90 electric degrees lagging. The circuit therefore supplies the phase shifted component of the thyratron grid potential.

The capacitor 21 and the variable resistor 34 connected in series across the armature of the motor function to apply a portion of the voltage wave or variations appearing across the armature 11 to the grid of the thyratron 10. The resistance of the variable resistor 34 effects the wave form of the potential across the capacitor 21 and this in turn advances or retards the firing angle of the thyratron 10, to maintain the speed of the armature 11 at a pre-set speed even though the load placed thereon varies. This feature of this circuit is described and claimed in our copending application Serial Number 12,321, filed March 1, 1948, now Patent No. 2,528,688, dated November 7, 1950.

In Figure 2 is illustrated a modified circuit arrangement in which the transformer 14 is provided with an additional secondary winding 40, one terminal of which is connected to the grid of the thyratron 10 and the other terminal of which is connected through the variable resistor 41 to the junction between the two sections 33a and 33b of the thyratron grid current limiting resistor. The remaining connections of the schematic wiring diagram shown in Figure 2 are the same as the connections of the wiring diagram illustrated in Figure 1 and corresponding parts of these two figures are designated by the same reference numerals.

By introducing the A. C. potential from the secondary 40 across the grid resistor section 33a of the thyratron grid circuit it is possible to reduce the speed of the armature 11 to low values without requiring a negative D. C. charge on the phase shifting capacitor 32 as previously described.

In this circuit arrangement the direct potential induced across the resistor 31 and the capacitor 32 does not necessarily have to be a well filtered, ripple free voltage. The direct potential employed may have pronounced ripples such as occur in a half wave rectifier output across a resistance load. The action of the resistor 31 and capacitor 32 is such as to absorb the D. C. component of any wave shape induced into the circuit.

While we have shown our system as applied to a motor control mechanism, it will be obvious that the system is useful in many other connections, and that the immediate application has been illustrated and described merely to illustrate the invention. We desire that our invention be limited only by the scope of the appended claims and the showing of the prior art.

We claim:

1. A thyratron control system for controlling a direct current motor having a field winding comprising a thyratron having an anode, a grid and a cathode, a direct current motor having an armature coupled to the cathode of said thyratron, a source of alternating current connected to said thyratron anode and to said motor armature, means for rectifying said alternating current to supply direct current pulses to said field winding, a phase shifting network connected to said alternating current supply and to said thyratron grid, a grid resistor connected between said thyratron grid and said phase shifting network and means for applying an alternating voltage across said grid resistor to facilitate control of said motor at low speeds.

2. A thyratron control system for controlling a direct current motor having a field winding comprising a thyratron having an anode, a grid and a cathode, a direct current motor having an armature coupled to the cathode of said thyratron, a source of alternating current connected to said thyratron anode and to said motor armature, means for rectifying said alternating current to supply direct current pulses to the field winding of the motor, a phase shifting network connected to said alternating current supply and to said thyratron grid, a resistor and a capacitor connected in series across said motor armature, means for connecting the grid circuit of said thyratron to the junction between said capacitor and said resistor, a grid resistor connected between said thyratron grid and said phase shifting network and means for applying an alternating voltage across said grid resistor to facilitate control of said motor at low speeds.

3. A thyratron control system for controlling a direct current motor having a field winding comprising a thyratron having an anode, a grid and a cathode, a direct current motor having an armature coupled to the cathode of said thyratron, a source of alternating current connected to said thyratron anode and to said motor armature, means for rectifying said alternating current to supply direct current pulses to said field winding, a phase shifting network connected to said alternating current supply and to said thyratron grid, a grid resistor connected between said thyratron grid and said phase shifting network, means for applying an alternating voltage across said grid resistor to facilitate control of said motor at low speeds, a dynamic brake resistor and means for connecting said dynamic brake resistor across said armature when said motor is to be stopped.

4. A thyratron system for controlling a direct current motor having a field comprising a thyratron having an anode, a grid and a cathode, a direct current motor having an armature coupled to the cathode of said thyratron, a pair of lines connected to a source of alternating current, one of said lines connected to said thyratron anode, a relay having a pair of contacts, one of said contacts on each side of said motor armature, means for rectifying said alternating current to supply direct current pulses to said motor field, connections for connecting one side of said relay to one side of said field, a normally closed "stop" switch connected in series with said relay and said motor armature, and a normally open "start" switch connected to one side of said "stop" switch and across one of said pair of relay contacts.

5. A thyratron control system for controlling a direct current motor having a field comprising a thyratron having an anode, a grid and a cathode, a direct current motor having an armature, a pair of lines connected to a source of alternating current, one of said lines connected to said thyratron anode, a relay having a pair of contacts, one of said contacts on each side of said motor armature, a rectifier for rectifying said alternating current to supply direct current pulses to said motor field, a normally closed "stop" switch, a normally open "start" switch, connections for connecting said "stop" switch, said "start" switch and said relay in series across said field to energize said relay from said rectifier, and connections for connecting said "start" switch across one of said pair of contacts whereby said contact functions as a holding-in-contact for said relay after said "start" switch is closed and released.

BERTHOLD A. KNAUTH.
PAO HSIUNG CHIN.

REFERENCES CITED

The following references are of record in the file of this patent:

UNITED STATES PATENTS

| Number | Name | Date |
| --- | --- | --- |
| 2,082,496 | Howe | June 1, 1937 |